(12) United States Patent
Marupaduga et al.

(10) Patent No.: US 11,026,282 B1
(45) Date of Patent: *Jun. 1, 2021

(54) USE OF SECONDARY-NODE BEAMWIDTH AS BASIS TO CONTROL WHETHER TO USE BLIND ADDITION OR RATHER THRESHOLD-BASED ADDITION WHEN CONFIGURING DUAL CONNECTIVITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/549,482

(22) Filed: Aug. 23, 2019

(51) Int. Cl.
*H04W 76/15* (2018.01)
*H04W 88/06* (2009.01)
*H04W 36/00* (2009.01)

(52) U.S. Cl.
CPC ....... *H04W 76/15* (2018.02); *H04W 36/0069* (2018.08); *H04W 36/0085* (2018.08); *H04W 88/06* (2013.01)

(58) Field of Classification Search
CPC ......... H04W 36/0055; H04W 36/0066; H04W 36/0069; H04W 36/0085; H04W 36/12; H04W 36/125; H04W 48/16; H04W 48/18; H04W 48/20; H04W 76/15; H04W 76/20; H04W 88/06
See application file for complete search history.

(56) References Cited

U.S. PATENT DOCUMENTS

| | | | |
|---|---|---|---|
| 9,391,368 B2* | 7/2016 | Clevorn | H01Q 3/34 |
| 9,900,925 B2 | 2/2018 | Fujishiro et al. | |
| 10,149,170 B2 | 12/2018 | Youn et al. | |
| 10,149,214 B2* | 12/2018 | Lu | H04W 48/20 |
| 10,659,978 B1* | 5/2020 | Marupaduga | H04L 5/001 |
| 10,848,205 B2* | 11/2020 | Kim | H04W 88/023 |
| 2013/0301455 A1* | 11/2013 | Jung | H04W 72/0406 370/252 |
| 2018/0092156 A1* | 3/2018 | Kim | H04W 72/1273 |
| 2018/0279218 A1 | 9/2018 | Park et al. | |
| 2019/0037625 A1 | 1/2019 | Shih et al. | |
| 2019/0182682 A1* | 6/2019 | Kim | H04W 16/28 |
| 2020/0028599 A1* | 1/2020 | Zhang | H04B 7/08 |
| 2020/0336920 A1* | 10/2020 | Li | H04W 16/28 |

\* cited by examiner

*Primary Examiner* — Tri H Phan (57) ABSTRACT

A mechanism for controlling configuration of dual connectivity for a UE that has a first connection with a first access node. The first access node could make a determination whether a beamwidth of a second access node with which the UE does not yet have a connection is at least as wide as a predefined threshold angle. If not, then the first access node could apply blind addition, in which the first access node works to add for the UE the second connection without requiring as a condition precedent the UE reporting being in threshold strong coverage of the second access node. Whereas, if so, then the first access node could instead apply threshold-based addition, in which the first access node works to add for the UE the second connection if and when the UE reports being in threshold strong coverage of the second access node.

20 Claims, 4 Drawing Sheets

USE OF SECONDARY-NODE BEAMWIDTH AS BASIS TO CONTROL WHETHER TO USE BLIND ADDITION OR RATHER THRESHOLD-BASED ADDITION WHEN CONFIGURING DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs, and the UE could responsively transmit the data to the access node in those PRBs.

In practice, the UE could also regularly evaluate the quality (e.g., based on reference-strength strength) of its coverage from its serving access node and could transmit an associated channel quality indicator (QCI), which the access node could use as a basis to set a modulation and coding scheme (MCS) to be used for downlink and uplink the air-interface communication between the access node and the UE. Higher quality coverage could correspond with a higher-order MCS, which could allow use of fewer air-interface resources (e.g., PRBs) to communicate given bearer data, whereas lower quality coverage could correspond with a lower-order MCS, which could require use of more air-interface resources to communicate given bearer data.

Further, for both the downlink and uplink air-interface communication, if the receiving end does not successfully receive a scheduled data communication from the transmitting end (which might happen if coverage conditions are relatively poor), the receiving end could responsively send to the transmitting end a negative acknowledgement (NACK), and the transmitting end could then responsively engage in re-transmission using air-interface resources of an upcoming subframe.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

These access nodes could be collocated in a common cell site, possibly sharing an antenna tower, and could be configured to provide coverage in generally the same direction and of generally the same scope as each other. Alternatively, the access nodes could be at separate cell sites but still configured to provide substantially overlapping or coterminous coverage.

When the UE enters into coverage of such a system, the UE could initially scan for coverage under the first RAT and discover threshold strong coverage of the MN, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT standalone mode (i.e., under just the first RAT) with packet-data communications as described above. For instance, when the core network has data to send to the UE, the data could flow to the MN, and the MN could schedule and provide transmission of the data on downlink PRBs to the UE, with the UE monitoring for scheduling directives and reading the data from the downlink PRBs. And when the UE has data to send, the UE could transmit a scheduling directive to the MN, the MN could schedule transmission of the data on uplink PRBs from the UE, and the UE could monitor for scheduling directives and transmit the data on the scheduled uplink PRBs.

In addition, once the UE is connected with the MN, the MN could engage in a process to coordinate setup of dual-connectivity for the UE, so that the UE can be served concurrently by the MN and the SN.

To do so, the MN could first engage in an SN-addition process to add for the UE a second-RAT connection with the SN, so that the MN and SN can then cooperatively provide the UE with dual-connectivity service over their respective connections with the UE. In an example implementation, for instance, the MN could transmit to the SN an SN-addition request message, providing RRC and DRB configuration information and other information for the second-RAT connection, and the SN could then responsively allocate resources for the second-RAT connection and reply to the MN an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data to the MN, which the MN could transmit to the UE over the UE's first-RAT connection. Likewise, when the UE has data to transmit, the UE could transmit a portion of the data over the UE's first-RAT connection to the MN, which the MN could forward to the SN and the SN could transmit over the UE's access bearer to the gateway system, and the UE could transmit another portion of the data over the UE's second-RAT connection to the SN, which the SN could transmit over the UE's access bearer to the gateway system.

While the above process of configuring dual-connectivity for a UE may work well practice, one technical issue with the process is how the MN would determine in the first place that the second-RAT connection with the SN should be established for the UE, and thus that the MN should engage in the SN-addition process to configure that second-RAT connection for the UE.

Here, the MN may have a choice of at least two different processes to apply. One option, referred to as "blind addition," involves the MN adding the second-RAT connection without requiring as a condition precedent that the UE report being within threshold strong coverage of the SN. And the other option, referred to as "threshold-based addition," involves the MN adding the second-RAT connection if and only if the UE reports being within threshold strong coverage of the SN, i.e., contingent on the UE reporting being within threshold strong coverage of the SN.

With blind addition, the MN could simply proceed to add the second-RAT connection for the UE (e.g., engage in signaling to facilitate that addition), on possible grounds that the MN and SN provide coverage of generally the same direction and scope as each other so that, if the UE is within sufficiently strong coverage of the MN, the UE is likely also within sufficiently strong coverage of the SN. Whereas, with threshold-based addition, the MN could transmit to the UE a measurement object that would cause the UE to report to the MN if and when the UE detects at threshold strong coverage of the SN under the second-RAT, and the MN would proceed to add the second-RAT connection for the UE if and when the UE provides that measurement report.

Disclosed herein is a mechanism to control which SN-addition process an MN will use in a given instance, such as to control whether the MN will apply the blind-addition process or rather the threshold-based-addition process.

In accordance with the disclosure, the MN will select between applying the blind-addition process and applying the threshold-based-addition process, with the selection being based at least on a beamwidth of the SN.

In practice, the MN and the SN could each have a respective antenna structure that is configured to transmit and receive electromagnetic signals in a region defined by an antenna pattern or radiation pattern. The antenna pattern of each access node defines a scope of coverage in which the access node can engage in downlink transmission to UEs and receive uplink transmission from UEs. In particular, the antenna pattern may define a main lobe and could be characterized by an azimuth angle, an elevation angle, and a beamwidth. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), and the beamwidth defines an angular width of the main lobe within the horizontal plane, typically measured between half-power (−3 dB) points of the main lobe for instance.

For dual-connectivity purposes, the antenna patterns of the MN and SN could be configured to provide largely the same scope of coverage as each other as noted above. For instance, they could be configured with the same azimuth angle and beamwidth as each other, and their elevation angles could be set such that the access nodes would provide coverage of approximately the same distance as each other, accounting for differences in path loss of their respective carriers, among other factors. Alternatively as noted above, the access nodes might have different antenna patterns and differences in scope of coverage.

In any event, the antenna pattern of the SN could be statically or dynamically configured. The SN's beamwidth in particular might be configured to an angle that is deemed sufficient to provide a desired width of coverage, such as 45°, 60°, 90°, or 120°, among other possibilities. Further, the SN's beamwidth might be adjustable through manual or automated changing of the direction, phase, or other parameters or one or more antenna elements of the SN's antenna structure, among other possibilities. Adjusting the SN's beamwidth may be desirable to accommodate changing traffic patterns, such as to expand coverage at busy hours or during scheduled events or the like.

If and when the SN's beamwidth is relatively narrow, UEs within coverage of the SN may more likely have stronger coverage from the SN, because the SN's transmission power would be more focused in a narrower area, and because there may be fewer UEs at the narrower distant edge of the SN's coverage. In that scenario, the MN could optimally apply the blind-addition process when adding for a UE a secondary connection with the SN, on grounds that the UE may more likely have good coverage of the SN. And the blind-addition could facilitate more quick SN addition.

Whereas, if the SN's beamwidth is wider, then UEs within coverage of the SN may more likely have weaker coverage from the SN, because the SN's transmission power may be spread across a wider area and because there may be more UEs at the wider distant edge of the SN's coverage. In that scenario, the MN could therefore instead apply the threshold-based addition process when adding for the UE the secondary connection with the SN, to help ensure that the UE is within strong enough coverage of the SN.

Note that, even if the MN and SN have largely the same coverage scope as each other so that the UE would be at the largely the same location in the SN's coverage as in the MN's coverage, applying threshold-based addition rather than blind addition could still be technically useful when the SN's beamwidth is relatively narrow, as quality of the SN's coverage may differ from quality of the MN's coverage due to differences in path loss and/or differences in interference or other issues on the MN's and SN's carriers.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
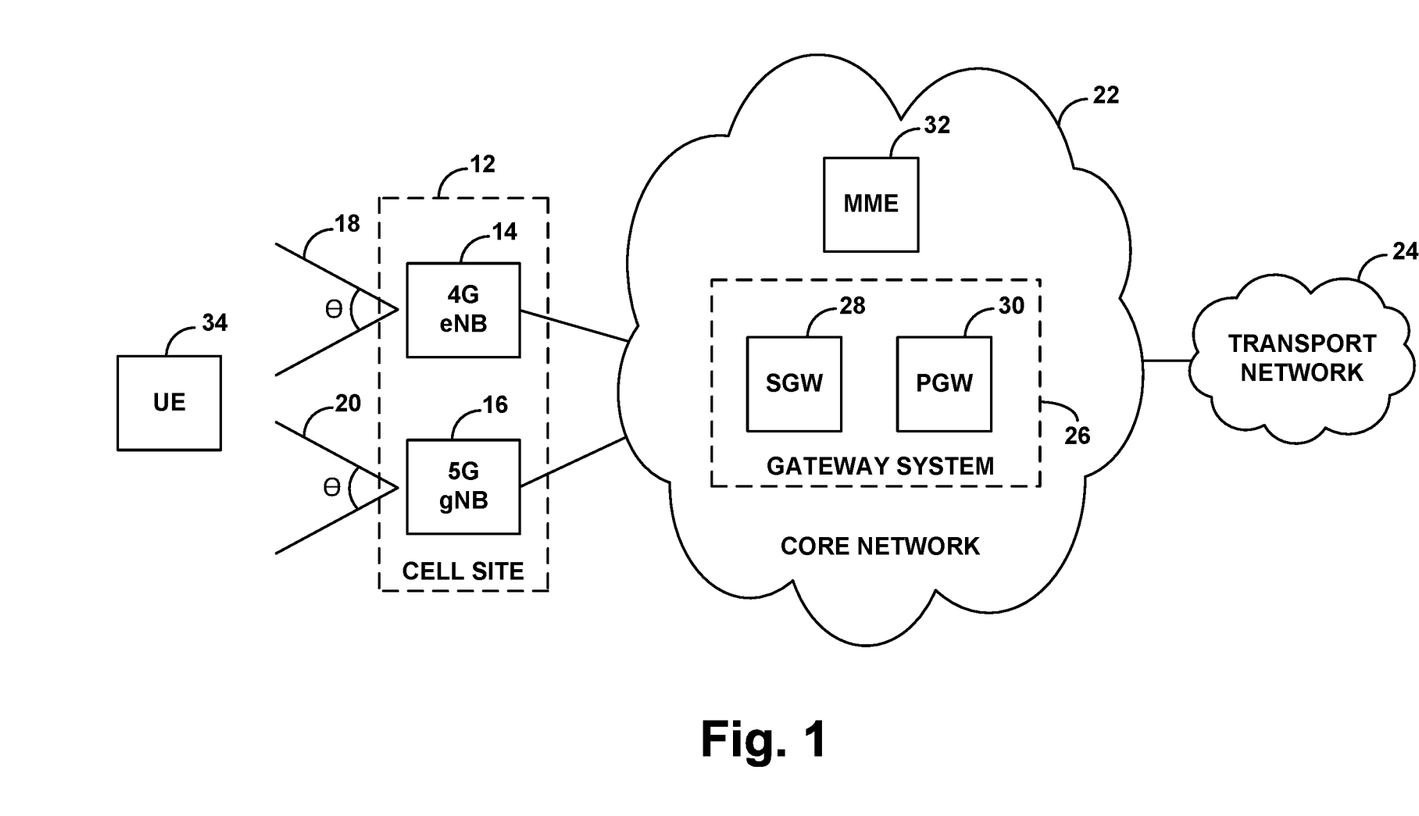
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective and/or shared antenna structure that is configured to provide an antenna pattern defining a beamwidth, which as noted above could be measured as the angle between the half-power points of the main lobe, among other possibilities. Further, as shown in the figure, the 4G eNB 14 and 5G gNB 16 in the example implementation could be configured with the same beamwidth $\theta$ as each other. Alternatively, they could be configured with different beamwidths than each other.

Also in line with the discussion above, the beamwidth $\theta$ of at least the 5G gNB 16 could be statically configured or could be dynamically configured. Configuration of the 5G gNB's beamwidth might be done through manual engineering input and/or automated means, by controlling physical orientation and/or one or more other attributes of one or more antenna elements of the 5G gNB's antenna structure, or in another manner now known or later developed. Initial configuration and/or adjustment of the 5G Gnb's beamwidth might be done to accommodate existing or predicted traffic needs and/or for one or more other reasons.

Each access node could provide coverage on one or more carriers according to a respective radio access technology. For instance, the 4G eNB 14 could provide 4G coverage 18 on one or more 4G carriers, and the 5G eNB 16 could provide 5G coverage 20 on one or more 5G carriers.

In an example implementation, the respective coverage on each carrier could be divided over time into frames, sub-frames, timeslots, and symbol segments, and could be divided over carrier frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes as further discussed above.

The 4G air interface and 4G service provided by 4G eNB 14 could differ from the 5G air interface and 5G service provided by the 5G gNB 16 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26 having a serving gateway (SGW) 28 and a packet-data network gateway (PGW) 30, which provides user-plane connectivity with the transport network 24. Further, the core network includes a mobility management entity (MME) 32, which serves as a core-network controller. Other core-network arrangements are also possible.

FIG. 1 also illustrates an example UE 34 within coverage of both 4G eNB 14 and 5G gNB 16. This UE could take any of the forms noted above, among other possibilities. Further, the UE could be equipped with a 4G LTE radio, a 5G NR radio, and associated circuitry and logic that enables the UE to engage in 4G LTE service, 5G NR service, and EN-DC service.

In line with the discussion above, when UE 34 initially enters into coverage of this network, the UE 34 could discover coverage of the 4G eNB 14, such as by scanning predefined 4G carriers to find a synchronization signal from the 4G eNB 14 and then determining that a reference signal from the 4G eNB 14 is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE 34 could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE 34 of at least one user-plane bearer. In particular, the MME 32 could engage in signaling with the 4G eNB 14 and the SGW 28 to coordinate setup for the UE 34 of an S1-U packet tunnel between the 4G eNB 14 and the SGW 30, and the SGW 28 could responsively engage in signaling with the PGW 30 to coordinate setup for the UE 34 of an associated S5 packet tunnel between the SGW 28 and the PGW 30. Further, the 4G eNB 14 could engage in signaling with the UE 34 to establish a DRB and other configuration parameters cooperatively defining a 4G connection for the UE 34.

As a last step of this attachment process, the 4G eNB 14 could also transmit to the UE 34 an RRC message carrying a UE-capability enquiry, and the UE 34 could respond to the 4G eNB 14 with a "UE capability information" information element (IE), which could indicate that the UE 34 is EN-DC capable.

As the UE 34 is EN-DC capable, the 4G eNB 14 could then work to configure EN-DC service for the UE 34. In line with the discussion above, for instance, the 4G eNB 14, operating as MeNB, could first engage in process to add the 5G gNB 16 as an SgNB for the UE 34, such as by transmitting to the 5G gNB 16 an SgNB-Addition request to cause the 5G gNB to allocate resources for a 5G connection for the UE 34 on one or more 5G carriers, receiving an SgNB-Addition-Request acknowledge message from the 5G gNB 16, and engaging in associated RRC signaling with the UE 34, in response to which the UE 34 could then access and complete establishment of the 5G connection. Further, the 4G eNB 14 could engage in signaling as described above to transfer to the UE's access bearer to the 5G gNB as well.

The 4G eNB 14 and 5G gNB 16 could then provide the UE 34 with EN-DC service, concurrently serving the UE 34 over their respective connections with the UE 34. Namely, the 4G eNB 14 could allocate PRBs of its 4G air interface as needed to carry data over the 4G connection between the 4G eNB 14 and the UE 34, and the 5G gNB could allocate PRBs of its 5G air interface as needed to carry data over the 5G connection between the 5G gNB 16 and the UE 34.

In accordance with the present disclosure as discussed above, the 4G eNB 14 could operate in either of at least two modes with respect to adding the 5G gNB 16 as a secondary node for providing EN-DC service: (i) a blind-addition-mode or (ii) a threshold-based-addition mode.

In the blind-addition mode, the 4G eNB 14 would simply proceed to add for the UE 34 the 5G connection with the 5G gNB 16 without requiring as a condition precedent that the UE 34 report being within threshold strong coverage of the 5G gNB 16. Whereas, in the threshold-based-addition mode, the 4G eNB 14 would require, as a condition precedent to adding that 5G connection for the UE 34, that the UE 34 report being within threshold strong coverage of the 5G gNB 16.

Specifically with threshold-based-addition, for instance, the 4G eNB 14 could transmit to the UE 34 (e.g., in an RRC message) a B1 (inter-RAT) measurement object that directs the UE to scan for coverage of the 5G gNB 16 and/or of one or more carriers on which the 5G gNB 16 operates, and that designates at least one B1 Measurement threshold. The B1 measurement threshold could be a minimum threshold level of reference signal receive power (RSRP) and/or reference signal receive quality (RSRQ) that the UE 34 has from the 5G gNB 16 as a condition for the UE 34 providing a B1 measurement report to the 4G eNB 14. For instance, the B1 measurement threshold could be RSRP on the order of at least −116 dBm to −95 dBm.

In line with the discussion above, the 4G eNB 14 could select which of at least these two modes to operate in, with the selection being based at least on the beamwidth of the 5G gNB 16. By way of example, the 4G eNB 14 could determine whether the beamwidth of the 5G gNB 16 equals or exceeds a predefined threshold angle. And based at least on that determination, the 4G eNB 14 could select between operating in the blind addition mode and operating in the threshold-based addition mode, when adding a secondary connection with the 5G gNB 16.

The threshold angle at issue could be a threshold wide angle, in which case the 4G eNB 14 could select and operate in the threshold-based addition mode if the determination is that the beamwidth of the 5G gNB 16 is at least as wide as that angle, and the 4G eNB 14 could select and operate in the blind-addition mode if the determination is that the beamwidth of the 5G gNB 16 is not as wide as that angle. Alternatively, the threshold angle could be a threshold narrow angle, in which case the 4G eNB 14 could select and operate in the blind-addition mode if the determination is that the bandwidth of the 5G gNB is at least as narrow as that angle, and the 4G eNB 14 could select and operate in the threshold-based addition mode if the determination is that the beamwidth of the 5G gNB 16 is not as narrow as that angle.

The predefined thresholds here could be matters of engineering design choice or automated analysis, possibly based on historical performance with various beamwidths and/or based on other analysis. Without limitation, an example wide-angle threshold might be in the range of 80° to 100°, and example narrow-angle threshold might be in the range of 30° to 60°.

To facilitate the 4G eNB's selection of SgNB-addition mode based on the 5G gNB's beamwidth, the 5G gNB 16 could report to the 4G eNB 14 the 5G gNB's currently configured beamwidth, or the 4G eNB 14 could receive other input indicating the 5G gNB's currently configured beamwidth. For instance, periodically or when the 5G gNB's beamwidth gets configured or reconfigured, the 5G gNB 16 could transmit to the 4G eNB 14, through an inter-access-node interface such as an X2 interface for instance, a report of the 5G gNB's beamwidth. Alternatively, the 4G eNB 14 might learn the 5G gNB's beamwidth by querying an element management system (EMS) or the like, or in another manner.

Further, the 4G eNB 14 could make the selection between blind-addition mode and threshold-based addition mode each time the 4G eNB 14 receives a new report of the 5G gNB's beamwidth. Alternatively or additionally, the 4G eNB 14 could make the selection at the time the UE 34 connects with the 4G eNB 14 and/or otherwise when the 4G eNB 14 is going to configure EN-DC service for the UE 34.

The 4G eNB 14 could then operate in the selected mode with respect to setting up EN-DC service for the UE 34. Thus, if the 4G eNB 14 decided based on the beamwidth of the 5G gNB 16 to operate in the blind-addition mode, then, based on that decision, the 4G eNB 14 could proceed directly with the SgNB-addition process to add for the UE a secondary connection with the 5G gNB 16, without requiring as a condition precedent (for so proceeding with the SgNB-addition process) that that the UE report being within threshold strong coverage of the 5G gNB 16. Whereas, if the 4G eNB 14 decided based on the beamwidth of the 5G gNB 16 to operate in the threshold-based-addition mode, then the 4G eNB 14 could provide the UE 34 with a B1 measurement object and, if and when the 4G eNB 14 receives from the UE 34 an associated B1 measurement report indicating that the UE is within threshold strong coverage of the 5G gNB 16, the 4G eNB could then proceed with the SgNB-addition process to add for the UE a secondary connection with the 5G gNB 16.

Note also that the 4G eNB 14 could take into account one or more additional factors as well in deciding whether to operate in the blind addition mode or rather in the threshold-based addition mode. By way of example, the 4G eNB 14 could additionally take into consideration the level of load of the 5G gNB 16, such as the PRB-utilization of the 5G gNB 16, the quantity of UEs connected with the 5G gNB 16, or other load metrics, which 4G eNB 14 might learn through reporting from the 5G gNB 16 and/or through other means. In an example implementation, the 4G eNB 14 might operate in the blind-addition mode if the 5G gNB's beamwidth is threshold narrow (or not threshold wide) or if the 5G gNB 16 is not threshold highly loaded. Whereas, the 4G eNB 14 might operate in the threshold-based addition mode if the 5G gNB's beamwidth is threshold wide (or not threshold narrow) and the 5G gNB 16 is threshold highly loaded. Other examples are possible as well.

Figure 2:
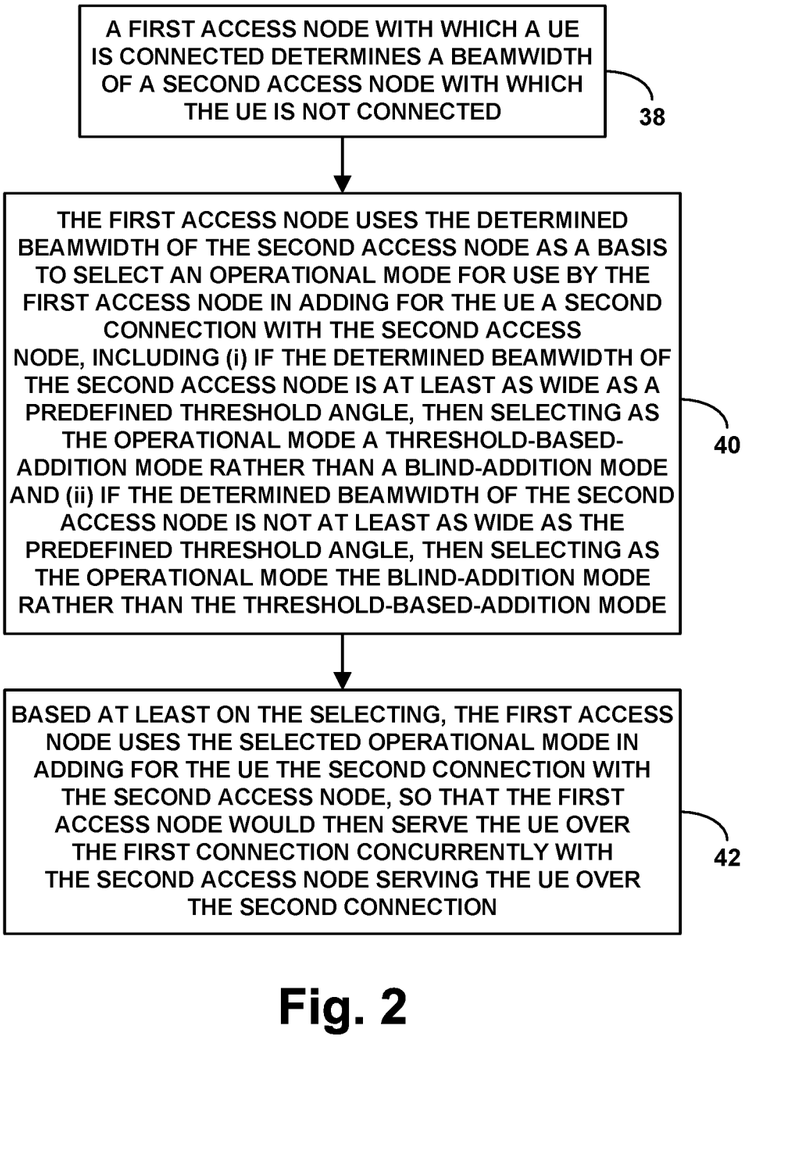
FIG. 2 is a flow chart depicting an example method in accordance with the disclosure.

FIG. 2 is a flow chart depicting an example method that can be carried out to control configuration of dual connectivity for a UE. This method could be carried out by or for a first access node with which the UE currently has a first connection, such as by 4G eNB 14 when UE 34 is connected with 4G eNB 14 for instance.

As shown in FIG. 2, at block 38, the method includes the first access node determining a beamwidth of a second access node with which the UE is not currently connected. For instance, the first access node could receive from the second access node a report of the beamwidth of the second access node.

At block 40, the method then includes the first access node using the determined beamwidth of the second access node as a basis to select an operational mode for use by the first access node in adding for the UE a second connection with the second access node, including (i) if the determined beamwidth of the second access node is at least as wide as a predefined threshold angle, then selecting as the operational mode a threshold-based-addition mode rather than a blind-addition mode and (ii) if the determined beamwidth the second access node at least as wide as the predefined threshold angle, then selecting as the operational mode the blind-addition mode rather than the threshold-based-addition mode.

And at block 42, the method includes, based at least on the selecting, the first access node using the selected operational mode in adding for the UE the second connection with the second access node, so that the first access node would then serve the UE over the first connection concurrently with the second access node serving the UE over the second connection.

In line with the discussion above, the act of using the blind-addition mode in adding for the UE the second connection with the second access node could involve adding for the UE the second connection with the second access node without requiring, as a condition precedent, the UE reporting being within threshold strong coverage of the second access node. Whereas, using the threshold-based-addition mode in adding for the UE the second connection with the second access node could involve adding for the UE the second connection with the second access node contingent on the UE reporting being within threshold strong coverage of the second access node.

Further, the act of the UE reporting being within threshold strong coverage of the second access node could involve the UE transmitting to the first access node a measurement report indicating that the UE is within threshold strong coverage of the second access node. For instance, the first connection could be according to a first RAT (e.g., 4G LTE), the second connection could be according to a second RAT (e.g., 4G NR), the dual connectivity could be EN-DC, and the measurement report could be a B1 measurement report.

As further discussed above, the method could additionally include the first access node determining a level of load of the second access node, such as by receiving from the second access node a report of the level of load of the second access node. And the method could then also include the first access node using the determined level of load of the second access node as an additional basis to select the operational mode for use by the first access node in adding for the UE a second connection with the second access node.

Figure 3:
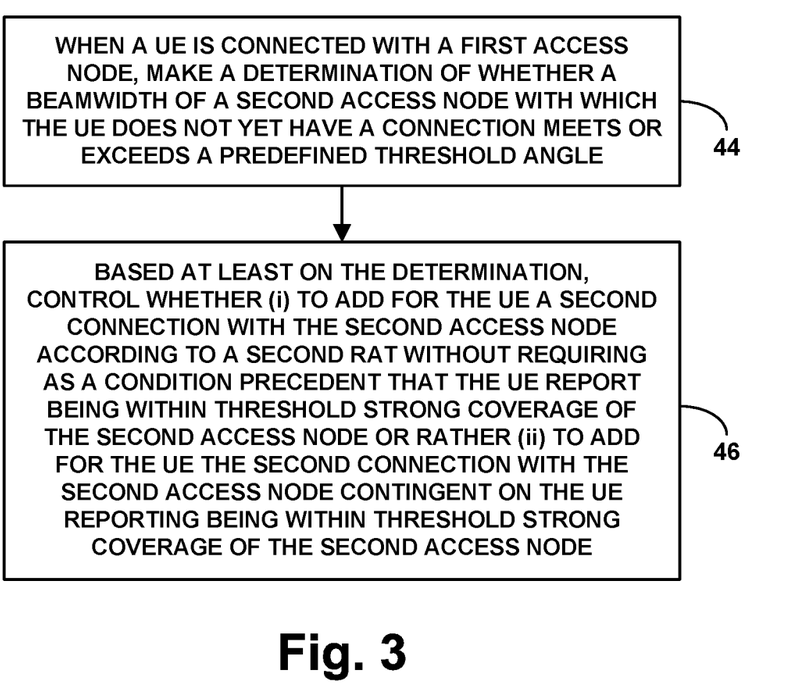
FIG. 3 is another flow chart depicting an example method in accordance with the disclosure.

FIG. 3 is next a flow chart depicting an example method that can be carried out to control configuration of dual connectivity for a UE that has a first connection with a first access node in accordance with a first RAT. This method could be carried out by the first access node, and/or by one or more other entities.

As shown in FIG. 3, at block 44, the method includes making a determination of whether a beamwidth of a second access node with which the UE does not yet have a connection meets or exceeds predefined threshold angle. And at block 46, the method includes, based at least on the determination, controlling whether (i) to add for the UE a second connection with the second access node according to a second RAT without requiring as a condition precedent that the UE report being within threshold strong coverage of the second access node or rather (ii) to add for the UE the second connection with the second access node contingent on the UE reporting being within threshold strong coverage of the second access node.

Various features described above can be implemented in this context as well, and vice versa.

For example, the predefined threshold angle could be a predefined threshold wide angle. And in that case, the act of controlling based at least on the determination whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node could involve (a) if the determination is that the beamwidth of the second access node does not meet or exceed the predefined threshold angle, then, based at least determination, engaging in a process to add for the UE the second connection with the second access node without requiring as a condition precedent that the UE report being within threshold strong coverage of the second access node, whereas (b) if the determination is that the beamwidth of the second access node meets or exceeds the predefined threshold angle, then, based at least on the determination, engaging in the process to add for the UE the second connection with the second access node only upon receiving from the UE a report of the UE being in threshold strong coverage of the second access node.

Further, the act of controlling, based at least on the determination, whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node could additionally involve, responsive to the determination being that the bandwidth of the second access node meets or exceeds the predefined threshold angle, transmitting to the UE a measurement object that causes the UE to scan for coverage of the second access node and to transmit to the first access node a measurement report if and when the coverage of the second access node is at least as strong as a predefined coverage-strength threshold. For instance, if the first access node operates under a first RAT and the second access node operates under a second RAT, then measurement object could be a B1 measurement object that causes the UE to scan for coverage under the second RAT and provide a B1 measurement report if and when the UE detects threshold strong coverage under the second RAT.

Still further, the method could additionally include basing the controlling on a level of load of the second access node.

Figure 4:
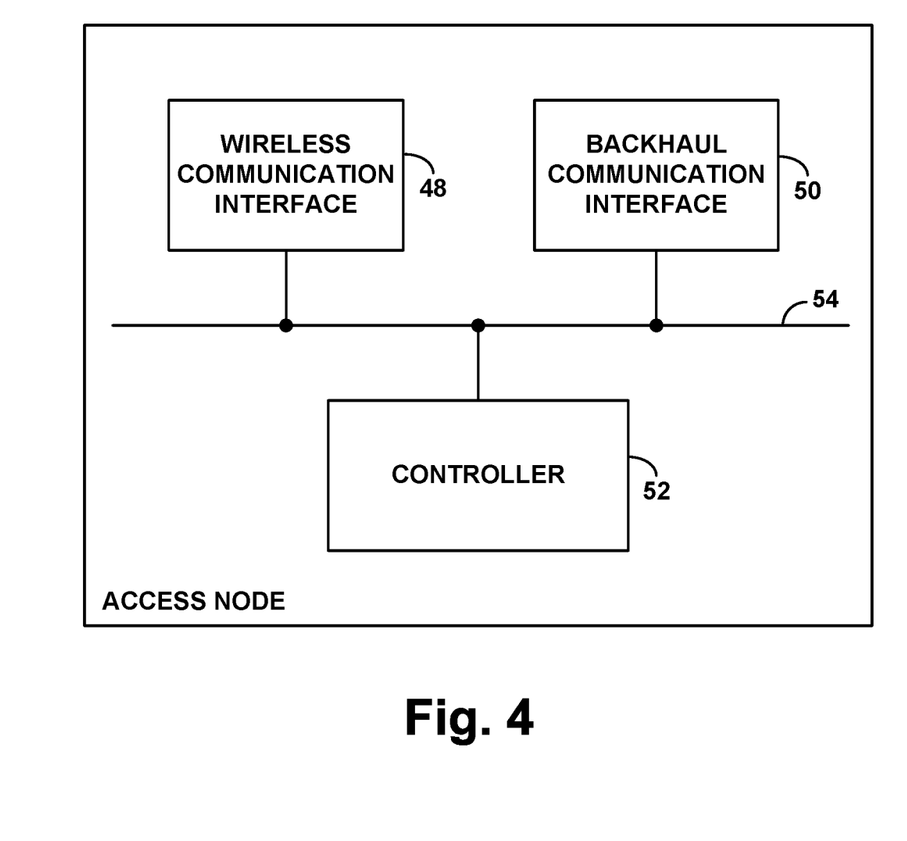
FIG. 4 is a simplified block diagram of an example access node operable in accordance with the disclosure.

FIG. 4 is a simplified block diagram of an example first access node, such as 4G eNB 14, showing some of the components that could be included in the access node in a non-limiting example implementation. As shown, the example first access node includes a wireless communication interface 48, a backhaul communication interface 50, and a controller 52, which could be integrated together in various ways (e.g., on a chipset) and/or interconnected by a system bus, network, or other communication mechanism 54 as shown.

The wireless communication interface 48 could include a radio and antenna structure through which the first access node could be configured to engage in air-interface communication and serve UEs according to a first RAT. And the backhaul communication interface 50 could comprise a wired or wireless network communication module, such as an Ethernet interface, through which to communicate with other entities, perhaps with the second access node and/or with one or more other entities on or via a core network.

Further, the controller 52 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out, or cause the first access node to carry out, various operations as described herein.

Various features discussed above can be implemented in this context as well, and vice versa.

For instance, the controller could be configured to control configuration of dual connectivity of a UE when the UE has a first connection with the first access node in accordance with the first RAT, such as by making a determination of whether a beamwidth of a second access node with which the UE is not yet connected meets or exceeds a predefined threshold angle, and, based at least on the determination, controlling whether to require, as a condition precedent to adding for the UE a second connection with the second access node according to a second RAT, that the UE report being within threshold strong coverage of the second access node.

In line with the discussion above, the act of controlling, based on the determination, whether to require, as the condition precedent to adding for the UE the second connection with the second access node, that the UE report being within threshold strong coverage of the second access node could involve requiring, as the condition precedent to adding for the UE a second connection with the second access node according to a second RAT, that the UE report being within threshold strong coverage of the second access node, with the requiring occurring if and only if the determination is that the beamwidth of the second access node is at least as wide as the predefined threshold angle.

Further, as discussed above, the act of requiring, as the condition precedent to adding for the UE a second connection with the second access node according to a second RAT, that the UE report being within threshold strong coverage of the second access node could involve transmitting to the UE a measurement object that causes the UE to scan for coverage of the second access node and to transmit to the first access node a measurement report with the transmitting of the measurement report occurring if and when the UE determines that the coverage of the second access node is at least as strong as a predefined coverage-strength threshold.

The present disclosure also contemplates a non-transitory computer-readable medium having encoded thereon (e.g., storing, embodying, containing, or otherwise incorporating) program instructions executable to cause a processing unit to carry out operations such as those described above.

Further, while the foregoing focuses on dual connectivity defined as involving service concurrently on two or more different RATs, the features described could extend as well to apply with respect to a single RAT, such as where a UE is connected with a first access node under a given RAT and at issue is adding for the UE of a second connection under the same RAT with a second access node to facilitate having the UE be served concurrently by both access nodes under that RAT.

Exemplary embodiments have been described above. Those skilled in the art will understand, however, that changes and modifications may be made to these embodiments without departing from the true scope and spirit of the invention.

We claim:

1. A method for controlling configuration of dual connectivity for a user equipment device (UE), the method comprising:
    determining, by a first access node with which the UE currently has a first connection, a beamwidth of a second access node with which the UE is not currently connected;
    using, by the first access node, the determined beamwidth of the second access node as a basis to select an operational mode for use by the first access node in adding for the UE a second connection with the second access node, including (i) if the determined beamwidth of the second access node is at least as wide as a predefined threshold angle, then selecting as the operational mode a threshold-based-addition mode rather than a blind-addition mode and (ii) if the determined beamwidth of the second access node is not at least as wide as the predefined threshold angle, then selecting as the operational mode the blind-addition mode rather than the threshold-based-addition mode; and
    based on the selecting, using by the first access node the selected operational mode in adding for the UE the second connection with the second access node, wherein the first access node then serves the UE over the first connection concurrently with the second access node serving the UE over the second connection.

2. The method of claim 1,
    wherein using the blind-addition mode in adding for the UE the second connection with the second access node comprises adding for the UE the second connection with the second access node without requiring, as a condition precedent, the UE reporting being within threshold strong coverage of the second access node, and
    wherein using the threshold-based-addition mode in adding for the UE the second connection with the second access node comprises adding for the UE the second connection with the second access node contingent on the UE reporting being within threshold strong coverage of the second access node.

3. The method of claim 2, wherein the UE reporting being within threshold strong coverage of the second access node comprises the UE transmitting to the first access node a measurement report indicating that the UE is within threshold strong coverage of the second access node.

4. The method of claim 3, wherein the first connection is according to a first radio access technology (RAT), the second connection is according to a second RAT, and the measurement report comprises a B1 measurement report.

5. The method of claim 4, wherein the first RAT is 4G LTE, wherein the second RAT is 5G NR, and wherein the dual connectivity is EUTRA-NR dual connectivity (EN-DC).

6. The method of claim 1, wherein determining by the first access node the beamwidth of a second access node comprises receiving from the second access node a report of the beamwidth of the second access node.

7. The method of claim 1, further comprising:
    determining by the first access node a level of load of the second access node; and using by the first access node the determined level of load of the second access node as an additional basis to select the operational mode for use by the first access node in adding for the UE a second connection with the second access node.

8. The method of claim 7, wherein determining by the first access node the level of load of the second access node comprises receiving from the second access node a report of the level of load of the second access node.

9. A method for controlling configuration of dual connectivity for a user equipment device (UE) that has a first connection with a first access node in accordance with a first radio access technology (RAT), the method comprising:
    making a determination of whether a beamwidth of a second access node with which the UE does not yet have a connection meets or exceeds a predefined threshold angle; and
    based at least on the determination, controlling whether (i) to add for the UE a second connection with the second access node according to a second RAT without requiring as a condition precedent that the UE report being within threshold strong coverage of the second access node or rather (ii) to add for the UE the second connection with the second access node contingent on the UE reporting being within threshold strong coverage of the second access node.

10. The method of claim 9, wherein the method is carried out by the first access node.

11. The method of claim 10, wherein the predefined threshold angle is a predefined threshold wide angle, and wherein controlling, based at least on the determination, whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node comprises:
    if the determination is that the beamwidth of the second access node does not meets or exceed the predefined threshold angle, then, based at least on the determination, engaging in a process to add for the UE the second connection with the second access node without requiring as a condition precedent that the UE report being within threshold strong coverage of the second access node; and
    if the determination is that the beamwidth of the second access node meets or exceeds the predefined threshold angle, then, based at least on the determination, engaging in the process to add for the UE the second connection with the second access node only upon receiving from the UE a report of the UE being in threshold strong coverage of the second access node.

12. The method of claim 11, wherein controlling, based at least on the determination, whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node further comprises:
    responsive to the determination being that the beamwidth of the second access node meets or exceeds the predefined threshold angle, transmitting to the UE a measurement object that causes the UE to scan for coverage of the second access node and to transmit to the first access node a measurement report if and when the coverage of the second access node is at least as strong as a predefined coverage-strength threshold.

13. The method of claim 11, wherein the measurement object is a B1 measurement object, and wherein the measurement report is a B1 measurement report.

14. The method of claim 11, further comprising determining the beamwidth of the second access node, based on signaling from the second access node.

15. The method of claim 11, further comprising additionally basing the controlling on a level of load of the second access node.

16. A first access node comprising:
    a wireless communication interface through which the first access node is configured to engage in air-interface communication according to a first radio access technology (RAT);
    a backhaul communication interface; and
    a controller configured to control configuration of dual connectivity of a user equipment device (UE) when the UE has a first connection with the first access node in accordance with the first RAT, wherein the controller is configured to make a determination of whether a beamwidth of a second access node with which the UE is not yet connected meets or exceeds a predefined threshold angle, and wherein the controller is configured to control, based at least on the determination, whether to require, as a condition precedent to adding for the UE a second connection with the second access node according to a second RAT, that the UE report being within threshold strong coverage of the second access node.

17. The first access node of claim 16, wherein controlling, based on the determination, whether to require, as the condition precedent to adding for the UE the second connection with the second access node, that the UE report being within threshold strong coverage of the second access node comprises:
    requiring, as the condition precedent to adding for the UE a second connection with the second access node according to a second RAT, that the UE report being within threshold strong coverage of the second access node, if and only if the determination is that the beamwidth of the second access node is at least as wide as the predefined threshold angle.

18. The first access node of claim 17, wherein requiring, as the condition precedent to adding for the UE a second connection with the second access node according to a second RAT, that the UE report being within threshold strong coverage of the second access node comprises:
    transmitting to the UE a measurement object that causes the UE to scan for coverage under the second RAT and to transmit to the first access node a measurement report if and when the coverage under the second RAT is at least as strong as a predefined coverage-strength threshold.

19. The first access node of claim 18, further comprising basing the controlling on a level of load of the second access node.

20. The first access node of claim 16, wherein the first RAT is 4G LTE, wherein the second RAT is 5G NR, and wherein the dual-connectivity is EUTRA-NR dual connectivity (EN-DC).

* * * * *